(12) United States Patent
Kajouke et al.

(10) Patent No.: US 9,365,122 B2
(45) Date of Patent: Jun. 14, 2016

(54) ONBOARD POWER LINE CONDITIONING SYSTEM FOR AN ELECTRIC OR HYBRID VEHICLE

(75) Inventors: Lateef A. Kajouke, San Pedro, CA (US); Milun Perisic, Torrance, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1303 days.

(21) Appl. No.: 13/237,848

(22) Filed: Sep. 20, 2011

(65) Prior Publication Data

US 2013/0069424 A1   Mar. 21, 2013

(51) Int. Cl.
*B60L 1/00*       (2006.01)
*B60L 11/18*      (2006.01)

(52) U.S. Cl.
CPC ......... *B60L 11/1812* (2013.01); *B60L 11/1842* (2013.01); *B60L 11/1844* (2013.01); *Y02E 60/721* (2013.01); *Y02T 10/7005* (2013.01); *Y02T 10/7072* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y04S 10/126* (2013.01)

(58) Field of Classification Search
CPC .... B60L 1/1812; Y02T 10/7005; Y02T 90/14
USPC ...................... 307/9.1; 363/17, 127
See application file for complete search history.

(56) References Cited

U.S. PATENT DOCUMENTS

| 6,628,106 B1 * | 9/2003 | Batarseh ............. H02M 3/1584 323/222 |
| 7,582,979 B2 | 9/2009 | Oyobe et al. |
| 7,646,160 B2 * | 1/2010 | Chen ..................... G01R 31/42 318/288 |
| 7,768,800 B2 * | 8/2010 | Mazumder ............ H02M 5/458 363/17 |
| 2001/0036086 A1 | 11/2001 | Pascu et al. |
| 2003/0173938 A1 * | 9/2003 | Trainer et al. .................. 323/205 |
| 2004/0100149 A1 * | 5/2004 | Lai .......................... H02J 9/062 307/82 |
| 2007/0029986 A1 * | 2/2007 | Nakamura ............... B60L 7/06 323/318 |

(Continued)

FOREIGN PATENT DOCUMENTS

CN            101193769 A     6/2008

OTHER PUBLICATIONS

State Intellectual Property Office of the Peoples' Republic of China, Office Action for Chinese Patent Application No. 201210351056.2, mailed Sep. 2, 2014.

(Continued)

*Primary Examiner* — Jared Fureman
*Assistant Examiner* — Alfonso Perez Borroto
(74) *Attorney, Agent, or Firm* — Ingrassia Fisher & Lorenz, P.C.

(57) ABSTRACT

A power line quality conditioning system for a vehicle includes an onboard rechargeable direct current (DC) energy storage system and an onboard electrical system coupled to the energy storage system. The energy storage system provides DC energy to drive an electric traction motor of the vehicle. The electrical system operates in a charging mode such that alternating current (AC) energy from a power grid external to the vehicle is converted to DC energy to charge the DC energy storage system. The electrical system also operates in a vehicle-to-grid power conditioning mode such that DC energy from the DC energy storage system is converted to AC energy to condition an AC voltage of the power grid.

19 Claims, 3 Drawing Sheets

(56) References Cited

U.S. PATENT DOCUMENTS

2008/0315803 A1* 12/2008 Yonemori ............ B60L 11/123 318/148
2012/0113700 A1* 5/2012 Kajouke et al. ............... 363/127

OTHER PUBLICATIONS

German Office Action, dated Dec. 11, 2012, for DE Application No. 10 2012 214 992.9.
Weise, N.D.; Baso, K.; Mohan, N., Advanced Modulation Strategy for a Three-Phase AC-DC Dual Active Bridge for V2G ; Vehicle Power and Propulsion Conference (VPPC), 2011 IEEE •Digital Object Identifier: 10.11091VPPC.2011.6043121,PublicationYear: 2011, pp. 1-6.
Kisacikoglu, M.C.; Ozpineci, B.; Tolbert, L.M., Examination of a Phev Bidirectional Charger System for V2g Reactive Power Compensation Applied Power Electronics Conference and Exposition (APEC), 2010 Twenty-Fifth Annual IEEE Topic(s): Power, Energy, & Industry Applications Digital Object Identifier: 10.11 09/APEC.201 0.5433629, Publication Year: 2010,pp. 458-465.

* cited by examiner

ONBOARD POWER LINE CONDITIONING SYSTEM FOR AN ELECTRIC OR HYBRID VEHICLE

STATEMENT REGARDING FEDERALLY SPONSORED RESEARCH OR DEVELOPMENT

This invention was made with Government support under Agreement No. DE-EE0002628, awarded by the United States Department of Energy. The Government has certain rights in this invention.

TECHNICAL FIELD

Embodiments of the subject matter described herein relate generally to electrical systems in automotive vehicles. More particularly, embodiments of the subject matter relate to an onboard vehicle system that functions in at least one operating mode as a vehicle-to-grid power line conditioner.

BACKGROUND

Matrix converters may be used in electric and/or hybrid vehicles to accommodate delivery of relatively high power over a relatively wide range of operating voltages, while at the same time achieving galvanic isolation, relatively high power factors, low harmonic distortion, relatively high power density and low cost. For example, bidirectional isolated matrix converters may be used to deliver energy from an alternating current (AC) energy source, such as the single-phase grid electricity common in most residential and commercial buildings, to charge a direct current (DC) energy storage element, such as a high voltage rechargeable battery, in a vehicle.

BRIEF SUMMARY

A power line quality conditioning system for a vehicle is presented here. The system includes a direct current (DC) energy storage system and a bidirectional matrix converter coupled to the DC energy storage system. The bidirectional matrix converter includes a control module and an alternating current (AC) interface to electrically couple the bidirectional matrix converter in parallel with an AC power source during a vehicle-to-source mode of operation. The control module is configured to control operation of the bidirectional matrix converter during the vehicle-to-source mode of operation to condition an AC voltage at the AC interface using energy from the DC energy storage system.

Another embodiment of a power line quality conditioning system for a vehicle is also provided. The system includes a rechargeable DC energy storage system onboard the vehicle and configured to provide DC energy to drive an electric traction motor of the vehicle. The system also includes an electrical system onboard the vehicle and coupled to the DC energy storage system, the electrical system configured to operate in a charging mode such that AC energy from a power grid external to the vehicle is converted to DC energy to charge the DC energy storage system. The electrical system also operates in a vehicle-to-grid power conditioning mode such that DC energy from the DC energy storage system is converted to AC energy to condition an AC voltage of the power grid.

Also provided is an onboard power line quality conditioning system for a vehicle. The system includes a rechargeable DC energy storage system onboard the vehicle and configured to provide DC energy to drive an electric traction motor of the vehicle. The system also includes an electrical system onboard the vehicle and configured for electrical coupling in parallel with an AC power grid to support a grid-to-vehicle charging mode and a vehicle-to-grid power conditioning mode. The system also includes an onboard control module for the electrical system, the control module configured to control operation of the electrical system during the vehicle-to-grid power conditioning mode to condition an AC voltage at an AC interface between the electrical system and the AC power grid.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
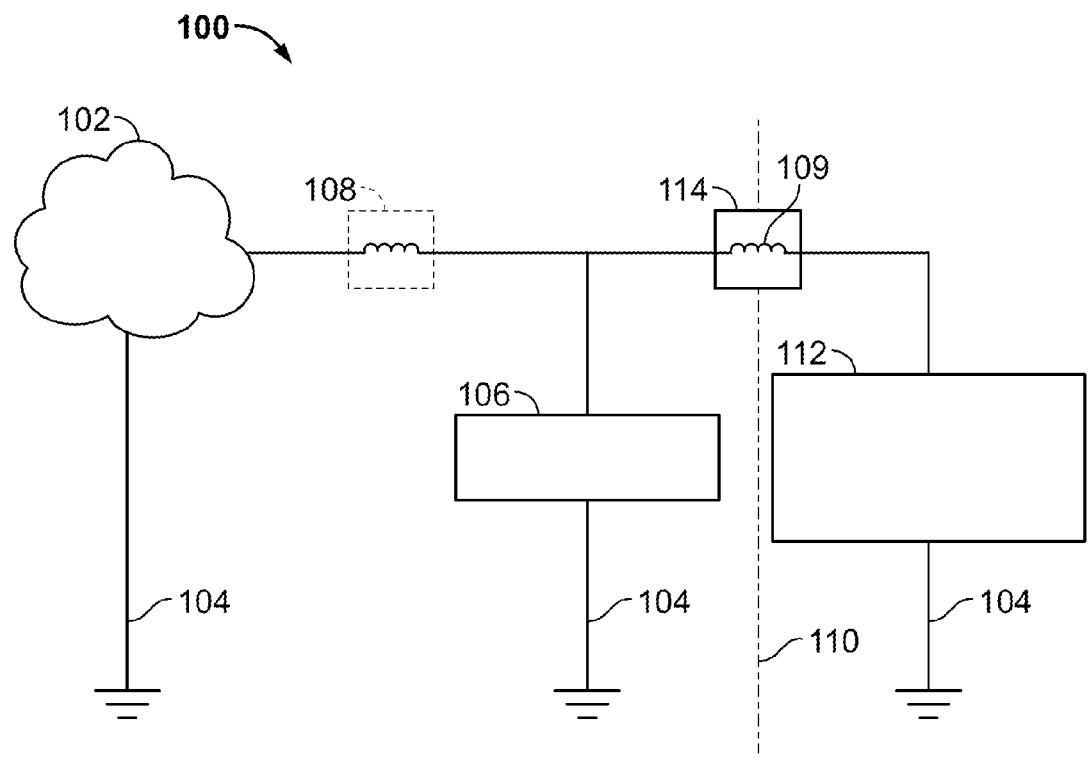
FIG. 1 is a schematic representation of an exemplary operating environment for a vehicle cooperating with an electrical power grid.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically.

In addition, certain terminology may also be used in the following description for the purpose of reference only, and thus is not intended to be limiting. For example, the terms "first", "second", and other such numerical terms referring to structures do not imply a sequence or order unless clearly indicated by the context.

A typical power line distribution system must handle various real-world issues such as reactive power, voltage mitigation, harmonics, phase balance, power outages, and power system damping. The system and technology presented herein relate to the adaptation of a vehicle-based bidirectional matrix converter for use as a vehicle-to-grid power line quality conditioner system. The conditioner system utilizes the onboard energy storage system of an electric/hybrid vehicle in a manner that conditions the power line. The onboard conditioner system makes it possible to mitigate some of the above-identified power system distribution problems.

FIG. 1 is a schematic representation of an exemplary operating environment 100 for a vehicle cooperating with a source of alternating current (AC) electrical energy, such as an electrical power grid 102. The power grid 102 can be conceptually modeled as an AC voltage source that has a ground 104 or any suitable reference point. The power grid 102 is electrically coupled in parallel to nonlinear loads 106 that obtain operating power from the power grid 102, as is well understood. FIG. 1 schematically depicts the line inductance 108 associated with the power grid 102; the line inductance 108 can be modeled as an inductor in series between the power grid 102 and the nonlinear loads 106.

FIG. 1 includes a dashed line 110 that represents a boundary of the vehicle. The right side of the dashed line 110 represents the host vehicle, and the left side of the dashed line 110 represents elements, features, and components that are not considered to be part of the host vehicle. For this example, the host vehicle includes an onboard vehicle-to-grid (or vehicle-to-source) power line quality conditioner system 112 that can be removably coupled to the power grid 102 at a node 114. The node 114 may be implemented as a connection panel that contains a line inductor 109, which provides a point of common connection (PCC) to the nonlinear load 106. In preferred embodiments, the conditioner system 112 is integrated with and incorporated into the host vehicle, and the conditioner system 112 is intended to be a fixed, stationary, and non-removable component of the host vehicle.

The vehicle input or connection may correspond to or be realized as a plug, a connector, or any suitably configured electrical interface feature. For example, the input may be implemented as a standard three-prong power cord plug that mates with a standard AC power outlet. When connected to the power grid 102 as depicted in FIG. 1, the conditioner system 112 is electrically parallel to both the power grid 102 and the nonlinear loads 106. As depicted in FIG. 1, the power grid 102, the nonlinear loads 106, and the conditioner system 112 are all referenced to the same ground 104. Accordingly, the conditioner system 112 represents a shunt power line quality conditioner system for the power grid 102.

Figure 2:
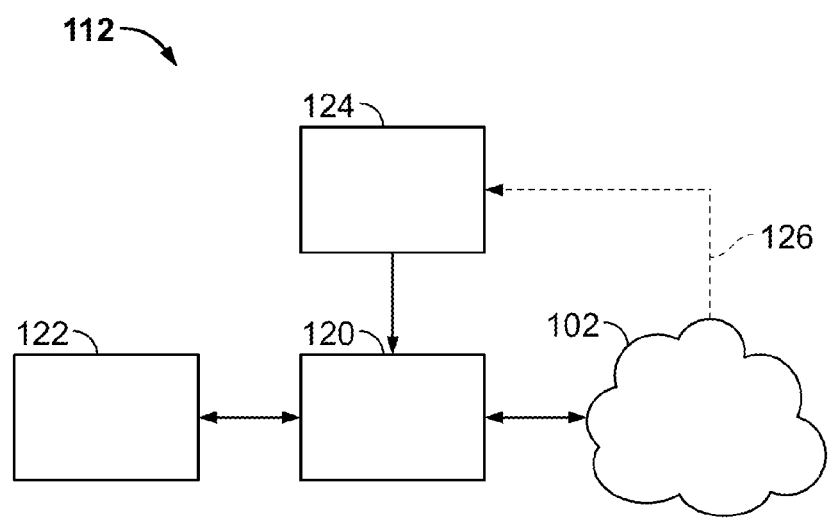
FIG. 2 is a schematic representation of an exemplary embodiment of an onboard vehicle-to-grid power line quality conditioner system.

In certain embodiments, the conditioner system 112 includes or cooperates with at least one direct current (DC) energy storage system of the host vehicle. Moreover, the conditioner system 112 may be based upon an electrical system that is configured to convert AC energy to DC energy (for purposes of charging the DC energy storage system of the host vehicle), and to convert DC energy into real and/or reactive AC energy (for purposes of conditioning the power line of the power grid). In this regard, FIG. 2 is a schematic representation of an exemplary embodiment of the conditioner system 112. This particular embodiment of the conditioner system 112 generally includes, without limitation: an electrical system 120; a DC electrical storage system (ESS) 122; and a data communication module 124.

The electrical system 120 can be removably coupled to the power grid 102 via the node 114 (see FIG. 1) as needed. For this embodiment, the electrical system 120 is configured and arranged as a bidirectional matrix converter (BMC). Moreover, the electrical system 120 can operate in different modes, including a grid-to-vehicle charging mode (where AC energy from the power grid 102 is converted for purposes of charging the ESS 122) and a vehicle-to-grid power line conditioning mode (where DC energy from the ESS 122 is converted to real and/or reactive AC energy placed onto the power grid 102).

The ESS 122 is coupled to the electrical system 120 to provide DC energy as needed. In an exemplary embodiment, the ESS 122 is realized as a rechargeable high-voltage battery pack having a nominal DC voltage range from about 200 to about 500 Volts DC. In this regard, the ESS 122 may comprise the primary energy source for another electrical system and/or an electric motor in a vehicle. For example, the ESS 122 may be coupled to a power inverter that is configured to provide voltage and/or current to the electric motor, which, in turn, may engage a transmission to drive the vehicle in a conventional manner. In other embodiments, the ESS 122 may be realized as a battery, an ultracapacitor, a fuel cell, or another suitable energy storage element.

The data communication module 124 may be configured to receive data (e.g., status information, commands, instructions, and/or requests) from a transmitting entity, device, system, or component. For example, the data communication module 124 may receive data from a component, station, or subsystem of the power grid 102, via a wireless or tangible link 126. In certain implementations, the data received at the data communication module 124 may identify or otherwise convey the current power line status or condition associated with the power grid 102, a desired or requested real power component to be generated by the conditioner system 112, a desired or requested reactive power component to be generated by the conditioner system 112, or the like. In response to the received data, the data communication module 124 provides corresponding commands, operating parameters, inputs, or variables to the electrical system 120. In turn, the conditioner system 112 is controlled in the manner described below to produce the desired real power and/or the desired reactive power to be placed onto the power grid 102.

Figure 3:
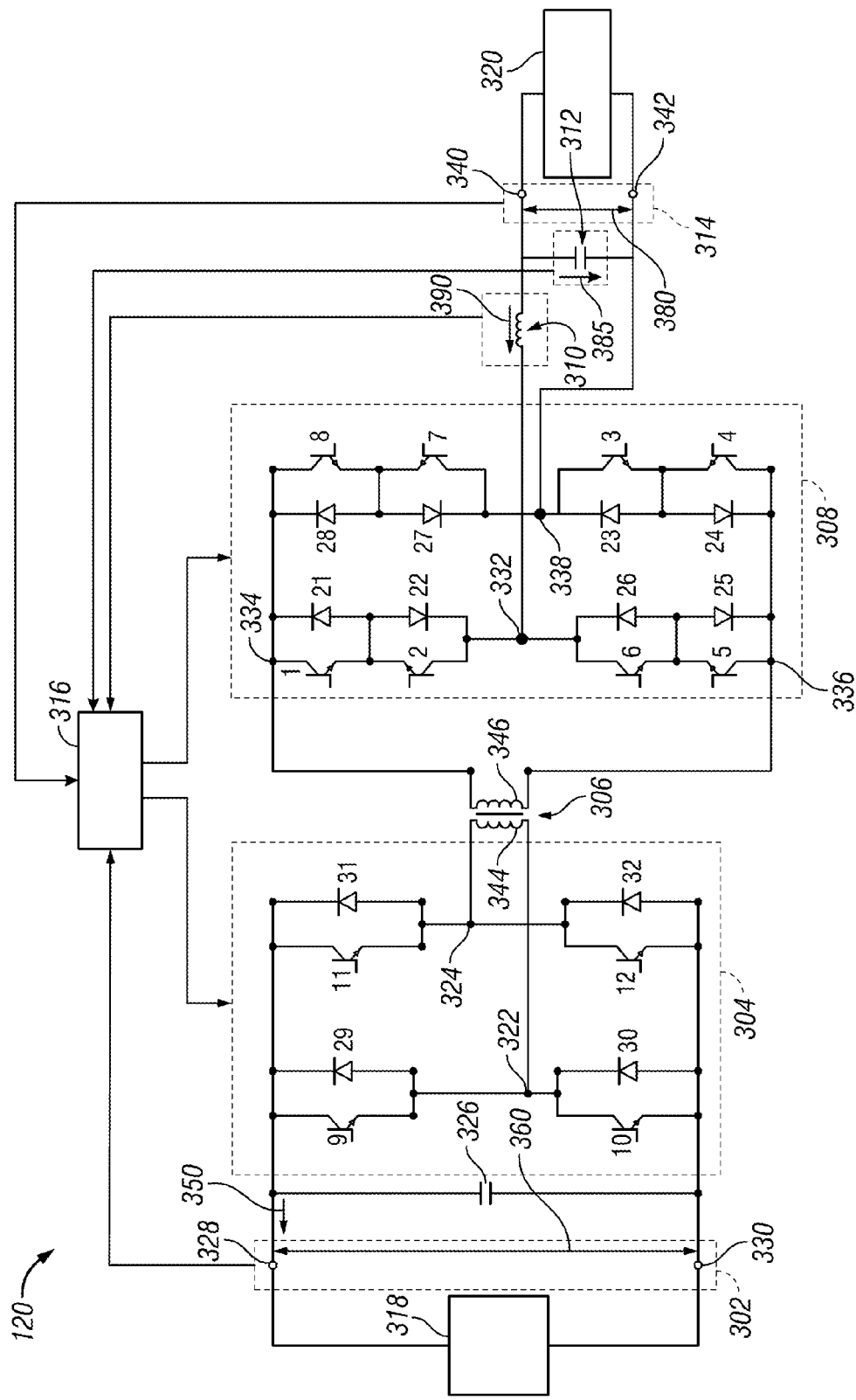
FIG. 3 is a schematic view of an exemplary embodiment of an electrical system suitable for use in a vehicle.

FIG. 3 depicts an exemplary embodiment of the electrical system 120, which is suitable for use in a vehicle, such as, for example, an electric or hybrid vehicle. The electrical system 120 includes, without limitation, a first interface 302, a first energy conversion module 304, an isolation module 306, a second energy conversion module 308, an inductive element 310, a capacitive element 312, a second interface 314, and a control module 316. The first interface 302 generally represents the physical interface (e.g., terminals, connectors, and the like) for coupling the electrical system 120 to a DC energy source 318, and the second interface 314 generally represents the physical interface (e.g., terminals, connectors, and the like) for coupling the electrical system 120 to an AC energy source 320 such as an electrical power grid. Accordingly, for convenience, the first interface 302 may be referred to herein as the DC interface and the second interface 314 may be referred to herein as the AC interface. In an exemplary embodiment, the control module 316 is coupled to the energy conversion modules 304, 308 and operates the energy conversion modules 304, 308 in a charging mode to deliver energy from the AC energy source 320 to the DC energy source 318 to achieve a desired DC output voltage ($V_{REF}$) at the DC interface 302. The control module 316 also operates the energy conversion modules 304, 308 in a vehicle-to-grid (V2G) power conditioning mode, as described in greater detail below.

In an exemplary embodiment, the DC energy source 318 (or alternatively, the energy storage source or ESS) provides and maintains a particular DC voltage level (indicated by arrow 360) across the first interface 302. As mentioned above with reference to FIG. 2, the DC energy source 318 could be realized as a rechargeable high-voltage battery pack having a nominal DC voltage range from about 200 to about 500 Volts DC.

The AC energy source 320 (or power source) provides and maintains a particular AC voltage level (indicated by arrow 380) across the second interface 314. The AC energy source 320 may be realized as a main power supply or main electrical system for a building, residence, or another structure within an electric power grid (e.g., mains electricity or grid power). In accordance with one embodiment, the AC energy source 320 comprises a single-phase power supply, as is common to most residential structures, which varies depending on the geographic region. For example, in the United States, the AC energy source 320 may be realized as 120 Volts (RMS) or 240 Volts (RMS) at 60 Hz, while in other regions the AC energy source 320 may be realized as 110 Volts (RMS) or 220 Volts (RMS) at 50 Hz. In alternative embodiments, the AC energy source 320 may be realized as any AC energy source suitable for operation with the electrical system 120.

As described in greater detail below, the DC interface 302 is coupled to the first energy conversion module 304 and the AC interface 314 is coupled to the second energy conversion module 308 via the inductive element 310. The isolation module 306 is coupled between the energy conversion modules 304, 308 and provides galvanic isolation between the two energy conversion modules 304, 308. The control module 316 is coupled to the energy conversion modules 304, 308 and operates the first energy conversion module 304 and the second energy conversion module 308 to convert DC energy to AC energy (in a vehicle-to-grid mode) and to convert AC energy to DC energy (in a grid-to-vehicle mode). The following description is focused on operation of the electrical system 120 in the vehicle-to-grid mode (e.g., the DC energy source 318 serving as an energy source for providing real and reactive AC components to the AC energy source 320). Nonetheless, it should be understood that the subject matter may be implemented and/or utilized in a grid-to-vehicle mode (e.g., the AC energy source 320 delivering energy to the DC energy source 318).

In the illustrated embodiment, the first energy conversion module 304 comprises four switching elements 9-12 with each switching element having a diode 29-32 configured antiparallel to the respective switching element to accommodate bidirectional energy delivery. As shown, a capacitor 326 is configured electrically in parallel across the DC interface 302 to reduce voltage ripple at the DC interface 302, as will be appreciated in the art.

In an exemplary embodiment, the switching elements 9-12 are transistors, and may be realized using any suitable semiconductor transistor switch, such as a insulated gate bipolar transistor (IGBT), a field-effect transistor (e.g., a MOSFET or the like), or any other comparable device known in the art. The switches and diodes are antiparallel, meaning the switch and diode are electrically in parallel with reversed or inverse polarity. The antiparallel configuration allows for bidirectional current flow while blocking voltage unidirectionally, as will be appreciated in the art. In this configuration, the direction of current through the switches is opposite to the direction of allowable current through the respective diodes. The antiparallel diodes are connected across each switch to provide a path for current to the DC energy source 318 for charging the DC energy source 318 when the respective switch is off.

In the illustrated embodiment, the switch 9 is connected between a node 328 of the DC interface 302 and a node 322, and the switch 9 is configured to provide a path for current flow from the node 328 to the node 322 when the switch 9 is closed. The diode 29 is connected between the node 322 and the node 328, and the diode 29 is configured to provide a path for current flow from the node 322 to the node 328 (e.g., the diode 29 is antiparallel to the switch 9). The switch 10 is connected between a node 330 of the DC interface 302 and the node 322, and the switch 10 is configured to provide a path for current flow from the node 322 to the node 330 when the switch 10 is closed. The diode 30 is connected between the node 322 and the node 330 to provide a path for current flow from the node 330 to the node 322. In a similar manner, the switch 11 is connected between the node 328 and a node 324 to provide a path for current flow from the node 328 to the node 324 when the switch 11 is closed, the diode 31 is connected between the node 324 and the DC interface 302 to provide a path for current flow from the node 324 to the node 328, the switch 12 is connected between the node 330 and the node 324 to provide a path for current flow from the node 324 to the node 330 when the switch 12 is closed, and the diode 32 is connected between the node 324 and the DC interface 302 to provide a path for current flow from the node 330 to the node 324.

In an exemplary embodiment, the second energy conversion module 308 facilitates the flow of current (or energy) between the AC energy source 320 and/or the inductive element 310 and the isolation module 306. In the illustrated embodiment, the second energy conversion module 308 is realized as a front end single-phase matrix conversion module comprising eight switching elements 1-8, with each switching element having a diode 21-28 configured antiparallel to the respective switching element, in a similar manner as set forth above in regards to the first energy conversion module 304. For convenience, but without limitation, the second energy conversion module 308 may alternatively be referred to herein as a matrix conversion module. As described in greater detail below, the control module 316 modulates (e.g., opens and/or closes) the switches 1-8 of the matrix conversion module 308 as needed to support the desired operating mode.

In the illustrated embodiment of FIG. 3, a first pair of switches 1, 2 and diodes 21, 22 are coupled between a node 332 and a node 334, with the first switch and antiparallel diode (e.g., the switch 1 and the diode 21) being configured with opposite polarity to the second switch and antiparallel diode (e.g., the switch 2 and the diode 22). In this manner, the switch 1 and the diode 22 are configured to provide a path for current flow from the node 334 through the switch 1 and the diode 22 to the node 332 when the switch 1 is closed, turned on, or otherwise activated and the voltage at the node 334 is more positive than the voltage at the node 332. The switch 2 and the diode 21 are configured to provide a path for current flow from the node 332 through the switch 2 and the diode 21 to the node 334 when the switch 2 is closed, turned on, or otherwise activated and the voltage at the node 332 is more positive than the voltage at the node 334. In a similar manner, a second pair of switches 3, 4 and diodes 23, 24 are coupled between a node 336 and a node 338, a third pair of switches 5, 6 and diodes 25, 26 are coupled between the node 332 and the node 336, and a fourth pair of switches 7, 8 and diodes 27, 28 are coupled between the node 334 and the node 338.

In the illustrated embodiment, the switches 1, 3, 5, 7 comprise a first set of switches which are capable of commutating the current through the inductive element 310 ($i_L$) (indicated by the arrow 390) from the node 338 to the node 332 when the current through the inductive element 310 is flowing in a negative direction (e.g., $i_L<0$), and the switches 2, 4, 6, 8 comprise a second set of switches that are capable of commutating the current through the inductive element 310 from the node 332 to the node 338 when the current through the inductive element 310 is flowing in a positive direction (e.g., $i_L>0$), as described in greater detail below. In other words, the switches 1, 3, 5, 7 are capable of conducting at least a portion of current flowing in a negative direction through the inductive element 310, and the switches 2, 4, 6, 8 are capable of conducting at least a portion of current flowing in a positive direction through the inductive element 310. As used herein, commutating should be understood as the process of cycling the current through the inductive element 310 through switches and diodes of the matrix conversion module 308 such that the flow of current through the inductive element 310 is not interrupted.

In an exemplary embodiment, the isolation module 306 comprises a first set of windings 344 connected between the nodes 322, 324 of the first energy conversion module 304, and a second set of windings 346 connected between the nodes 334, 336. For purposes of explanation, the windings 346 may be referred to herein as comprising the primary winding stage (or primary windings) and the windings 344 may be referred to herein as comprising the secondary winding stage (or secondary windings). The windings 344, 346 provide inductive elements that are magnetically coupled in a conventional manner to form a transformer, as will be appreciated in the art. In an exemplary embodiment, the isolation module 306 is realized as a high-frequency transformer. In this regard, the isolation module 306 comprises a transformer designed for a particular power level at a high-frequency, such as the switching frequency of the switches of the energy conversion modules 304, 308 (e.g., 50 kHz), resulting in the physical size of the transformer being reduced relative to a transformer designed for the same power level at a lower frequency, such as the frequency of the AC energy source 320 (e.g., the mains frequency).

In an exemplary embodiment, the inductive element 310 is realized as an inductor configured electrically in series between the node 332 of the matrix conversion module 308 and a node 340 of the AC interface 314. Accordingly, for convenience, but without limitation, the inductive element 310 is referred to herein as an inductor. The inductor 310 functions as a high-frequency inductive energy storage element during operation of the electrical system 120. The capacitive element 312 is realized as a capacitor coupled between the node 340 and a node 342 of the AC interface 314, that is, the capacitor 312 is configured electrically parallel to the AC interface 314. The capacitor 312 and inductor 310 are cooperatively configured to provide a high frequency filter to minimize voltage ripple at the AC interface 314 attributable to modulating the switches 1-8.

The control module 316 generally represents the hardware, firmware and/or software configured to operate and/or modulate the switches of the energy conversion modules 304, 308 to achieve a desired power flow from the DC energy source 318 to the AC energy source 320. Depending on the embodiment, the control module 316 may be implemented or realized with a general purpose processor, a microprocessor, a microcontroller, a content addressable memory, a digital signal processor, an application specific integrated circuit, a field programmable gate array, any suitable programmable logic device, discrete gate or transistor logic, discrete hardware components, or any combination thereof, designed to support and/or perform the functions described herein.

During operation for grid-to-vehicle applications, the control module 316 determines PWM command signals that control the timing and duty cycles of the switches 1-8 of the matrix conversion module 308 to produce a high-frequency AC voltage across the primary windings 346 of the isolation module 306. The high-frequency AC voltage across the primary windings 346 induces a voltage across the secondary windings 344 at the nodes 322, 324 that results in a desired current flowing to the DC interface 302 to charge or otherwise deliver energy to the DC energy source 318. The control module 316 generates a PWM duty cycle control value that influences, governs, or otherwise controls the duty cycle of the switches 1-8 to implement the appropriate switching pattern during a switching interval (e.g., the inverse of the switching frequency). During the switching interval (or PWM cycle), the control module 316 alternates between operating the switches 1-8 to effectively short-circuit the nodes 332, 338 and cycle energy through the matrix conversion module 308 to apply a voltage across the inductor 310 before operating the switches 1-8 to release the stored energy and/or voltage of the inductor 310 (alternatively, the fly-back voltage). The sum of the fly-back voltage and the AC voltage level 380 at the AC interface 314 is applied to the primary windings 346 of the isolation module 306, resulting in a power transfer to the nodes 322, 324 and/or DC energy source 318. In this manner, the control module 316 operates the switches 1-8 of the matrix conversion module 308 to alternate between cycling energy through the inductor 310 and delivering energy to the DC interface 302. The percentage of the switching interval (or PWM cycle) that the matrix conversion module 308 is delivering energy to the DC interface 302 corresponds to the duty cycle of the matrix conversion module 308 during that respective switching interval.

During operation for vehicle-to-grid applications, the control module 316 operates the first energy conversion module 304 to produce high frequency square wave voltage across the first set of windings 344 of the isolation module 306 at a designated switching rate, e.g., 50 kHz. The high frequency voltage is magnetically coupled to nodes 334, 336 via the second set of windings 346. The control module 316 provides sine wave PWM, SPWM, switching pattern to control the switching devices of the energy conversion module 308. The result of the SPWM control switching pattern is converting the high frequency voltage, 50 kHz, at nodes 334, 336 to a low frequency voltage (e.g., 60 Hz), at nodes 340, 342.

In an exemplary embodiment, the control module 316 obtains or otherwise monitors: the current 390 through the inductor 310 (e.g., a measured inductor current ($i_L$) via a current sensor electrically in series with the inductor 310); the current (indicated by arrow 385) through the capacitor 312 (e.g., a measured capacitor current ($i_{CAP}$) via a current sensor electrically in series with the capacitor 312); the AC voltage level 380 at the AC interface 314; and the DC voltage level 360 at the DC interface 302. The control module 316 implements a control system to determine a PWM duty cycle control value for operating the switches 1-8 of the matrix conversion module 308 and the switches 9-12 of the first energy conversion module 304, as needed. In an exemplary embodiment, the control module 316 obtains measured instantaneous values for the inductor current ($i_L$), the capacitor current ($i_{CAP}$), the voltage ($V_{AC}$) at the AC interface 314, and the voltage ($V_{DC}$) at the DC interface 302 that are sampled, measured, or otherwise obtained at a particular instant in time during a current PWM cycle, wherein the PWM duty cycle control value determined by the control module 316 governs operation of the electrical system 120 during the subsequent PWM cycle.

It should be understood that FIG. 3 is a simplified representation of the electrical system 120 for purposes of explanation and is not intended to limit the scope or applicability of the subject matter described herein in any way. Thus, although FIG. 3 depicts direct electrical connections between circuit elements and/or terminals, alternative embodiments may employ intervening circuit elements and/or components while functioning in a substantially similar manner. Additionally, although the electrical system 120 is described herein in the context of a matrix conversion module 308 for a vehicle, the subject matter is not intended to be limited to vehicular and/or automotive applications, and the subject matter described herein may be implemented in other applications where an energy conversion module is utilized to transfer energy using switching elements or in other electrical systems where feed forward control schemes are utilized to achieve power factor correction by modeling the input port as a loss-free resistor.

Figure 4:
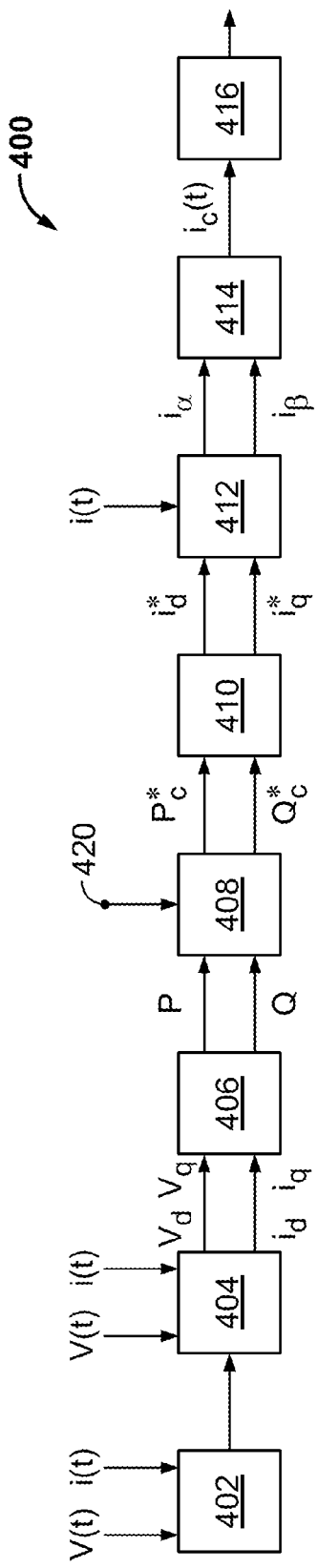
FIG. 4 is a block diagram of an exemplary embodiment of a control system suitable for use with the electrical system of FIG. 3.

FIG. 4 depicts an exemplary embodiment of a control system 400 suitable for use by the control module 316 of FIG. 3. The control system 400 regulates and manages the operation of the switches in the electrical system 120 to provide power flow control and compensation during the vehicle-to-grid power line quality conditioning mode. This exemplary embodiment of the control system 400 includes, without limitation: an instantaneous phase angle detector 402; a coordinate transformation module 404; an instantaneous power calculation module 406; a power compensation selector 408; a power to current converter 410; a current loop module 412; a control current generator 414; and a gate driver module 416. The elements, modules, and illustrated components of the control system 400 can be realized as processing logic executed by the control module 316.

The phase angle detector 402 obtains the instantaneous voltage at the node 114 and the instantaneous current flowing out of the vehicle to the grid at the node 114 (see FIG. 1). The instantaneous time domain voltage, V(t), and the instantaneous time domain current i(t) serve as inputs to the phase angle detector 402. The phase angle detector 402 detects the phase and frequency of the grid voltage based on the instantaneous voltage and current. The coordinate transformation module 404 transforms the single phase voltage and current into d-q frame coordinates, where the d-component represents the real component and the q-component is 90 degrees out of phase with the d-component. Thus, the coordinate transformation module 404 receives the output of the phase angle detector 402 and generates a voltage (expressed in d-q coordinates) and a current (expressed in d-q coordinates).

The outputs of the coordinate transformation module 404 serve as inputs to the instantaneous power calculation module 406. The instantaneous power calculation module 406 calculates the instantaneous values of real power, P, and reactive power, Q, from the voltage and current expressed in d-q coordinates. In particular:

$$P = v_d \cdot i_d + v_q \cdot i_q$$

$$Q = v_q \cdot i_d - v_d \cdot i_q$$

The values of P and Q are provided as inputs to the power compensation selector 408, which also obtains a command, instruction, or request 420 that influences the selection of active or reactive power compensation. The request 420 may represent a requested real power component to be generated by the electrical system 120, a requested reactive power component to be generated by the electrical system 120, or the like. As mentioned above with reference to FIG. 2, the request 420 may originate from a system or component of the power grid. Depending upon the nature of the request 420, the power compensation selector 408 selects active (real) power, reactive power, or both for purposes of vehicle-to-grid power line compensation. Accordingly, the data communication module 124 (see FIG. 2) may be used to receive data (e.g., a power compensation or conditioning request 420) that influences conditioning of the AC voltage at the AC interface 314.

In response to the received request 420, the power compensation selector 408 determines and generates a real power control command, $P^*_C$, and/or a reactive power control command, $Q^*_C$ (the asterisk notation indicates that the quantity is a commanded or requested quantity). These quantities represent the power that the vehicle should place onto the power grid. The power to current converter 410 considers the instantaneous power (P and Q) present at the node 114 and produces a current command in the d-q frame as an output. For this particular embodiment, the power to current converter performs the following operation to generate the d-q current command components:

$$\begin{bmatrix} i^*_d \\ i^*_q \end{bmatrix} = \frac{1}{v_d^2} \begin{bmatrix} v_d & v_q \\ v_q & v_d \end{bmatrix} \begin{bmatrix} P \\ Q \end{bmatrix}$$

The resulting current command components ($i^*_d$ and $i^*_q$) serve as inputs to the current loop module 412, which also receives the instantaneous time domain current measured at the node 114, i(t), as an input. The current loop module 412 compares the instantaneous current at the node 114 to the commanded current components and generates the current coordinates that are needed to obtain the desired current at the node 114. As shown in FIG. 4, the current loop module 412 produces a current in alpha-beta coordinates, namely, $i_\alpha$ and $i_\beta$.

The control current generator 414 processes the alpha-beta current coordinates and converts the alpha-beta current into a control current in the time domain, $i_C(t)$. This control current is the desired current that is utilized to drive the PWM gate drivers of the gate driver module 416. The PWM gate drivers regulate and control the operation of the switches 1-12 in the electrical system 120 (see FIG. 3). Accordingly, this control scheme enables the control module 316 to regulate and control the operation of the electrical system 120 for purposes of conditioning the power seen at the node 114.

Figure 5:
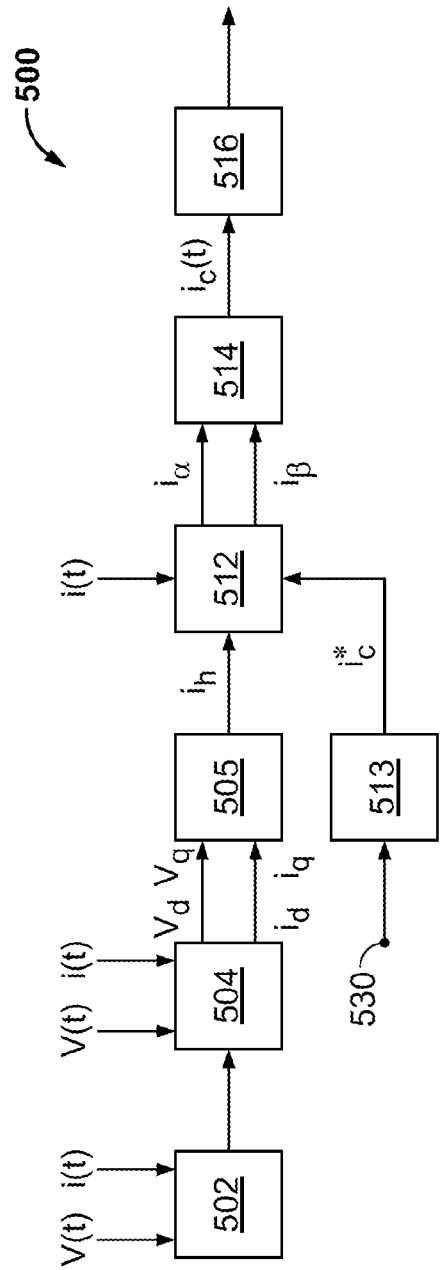
FIG. 5 is a block diagram of another exemplary embodiment of a control system suitable for use with the electrical system of FIG. 3.

FIG. 5 is a block diagram of another exemplary embodiment of a control system 500 suitable for use with the electrical system 120. The control system 500 regulates and manages the operation of the switches in the electrical system 120 to provide power harmonics control and compensation during the vehicle-to-grid power line quality conditioning mode. In practice, the control system 500 may cooperate with the control system 400 to control the operation of the electrical system 120. In this regard, the control systems 400, 500 could be integrated into a combined control system having the desired functionality.

The exemplary embodiment of the control system 500 includes, without limitation: an instantaneous phase angle detector 502; a coordinate transformation module 504; a harmonic detection module 505; a current loop module 512; a control current generator 514; and a gate driver module 516. The elements, modules, and illustrated components of the control system 500 can be realized as processing logic executed by the control module 316.

The instantaneous phase angle detector 502 and the coordinate transformation module 504 are configured to function as described above for their counterparts in the control system 400. The harmonic detection module 505 receives and processes the d-q voltage components and the d-q current components (which are provided by the coordinate transformation module 504). The harmonic detection module 505 determines the harmonic current, $i_h$, at the node 114 (see FIG. 1) from the voltage and current expressed in d-q coordinates. The harmonic current serves as one input to the current loop module 512.

The DC bus voltage regulator monitors the DC bus voltage 530 and generates a control current command, $i^*_C$, in response to the DC bus voltage 530. For this example, the DC bus voltage 530 corresponds to the DC voltage level 360 across the first interface 302 (see FIG. 3). The control current command serves as a second input to the current loop module 512, which also receives the instantaneous current measured at the node 114, i(t) as another input. The current loop module 512 processes i(t), $i_h$, and $i^*_C$ to generate the current coordinates that are needed to obtain the harmonic current at the node 114. As shown in FIG. 5, the current loop module 512 produces a current in alpha-beta coordinates, namely, $i_\alpha$ and $i_\beta$.

The control current generator 514 and the gate driver module 516 are configured to function as described above for their counterparts in the control system 400. Thus, the control system 500 enables the control module 316 to regulate and control the operation of the electrical system 120 for purposes of harmonic conditioning of the power seen at the node 114. In certain embodiments, power conditioning and harmonic conditioning are performed in a sequential or alternating manner (i.e., at different times).

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A power line quality conditioning system for a vehicle, the system comprising:
   a direct current (DC) energy storage system;
   a bidirectional matrix converter coupled to the DC energy storage system and comprising a control module and an alternating current (AC) interface to electrically couple the bidirectional matrix converter in parallel with an AC power source during a vehicle-to-source mode of operation, wherein the control module is configured to control operation of the bidirectional matrix converter during the vehicle-to-source mode of operation to condition an AC voltage at the AC interface using energy from the DC energy storage system; and
   a data communication module coupled to the bidirectional matrix converter to receive data that influences conditioning of the AC voltage at the AC interface during the vehicle-to-source mode of operation.

2. The system of claim 1, wherein the control module is configured to control operation of the bidirectional matrix converter during the vehicle-to-source mode of operation to provide AC power flow and compensation at the AC interface using energy from the DC energy storage system.

3. The system of claim 2, wherein the control module is configured to:
   obtain an instantaneous time domain voltage at the AC interface;
   obtain an instantaneous time domain current at the AC interface;
   obtain a power compensation request; and
   process the instantaneous time domain voltage, the instantaneous time domain current, and the power compensation request to generate a time domain control current to control operation of a plurality of switches of the bidirectional matrix converter.

4. The system of claim 1, wherein the control module is configured to control operation of the bidirectional matrix converter during the vehicle-to-source mode of operation to provide power harmonics control and compensation at the AC interface using energy from the DC energy storage system.

5. The system of claim 4, wherein the control module is configured to:
   obtain an instantaneous time domain voltage at the AC interface;
   obtain an instantaneous time domain current at the AC interface;
   obtain a DC voltage associated with the DC energy storage system; and
   process the instantaneous time domain voltage, the instantaneous time domain current, and the DC voltage to generate a time domain control current to control operation of a plurality of switches of the bidirectional matrix converter.

6. The system of claim 1, wherein the data indicates a requested real power component to be generated by the bidirectional matrix converter.

7. The system of claim 1, wherein the data indicates a requested reactive power component to be generated by the bidirectional matrix converter.

8. The system of claim 1, wherein the data originates from a component of an AC power grid.

9. The system of claim 1, wherein the DC energy storage system comprises a DC energy source of an electric traction motor of the vehicle.

10. The system of claim 1, wherein the control module is configured to control operation of the bidirectional matrix converter during a source-to-vehicle mode of operation to convert AC energy from the AC power source to charge the DC energy storage system.

11. A power line quality conditioning system for a vehicle, the system comprising:
    a rechargeable direct current (DC) energy storage system onboard the vehicle and configured to provide DC energy to drive an electric traction motor of the vehicle;
    an electrical system onboard the vehicle and coupled to the DC energy storage system, the electrical system configured to operate in a charging mode such that alternating current (AC) energy from a power grid external to the vehicle is converted to DC energy to charge the DC energy storage system, and the electrical system configured to operate in a vehicle-to-grid power conditioning mode such that DC energy from the DC energy storage system is converted to AC energy to condition an AC voltage of the power grid; and
    a data communication module coupled to the electrical system to receive data that influences conditioning of the AC voltage during operation in the vehicle-to-grid power conditioning mode.

12. The system of claim 11, wherein the electrical system comprises a bidirectional matrix converter.

13. The system of claim 12, wherein the bidirectional matrix converter comprises a plurality of switches and a control module coupled to the plurality of switches and configured to control operation of the plurality of switches.

14. The system of claim 13, wherein the control module is configured to control operation of the plurality of switches during the vehicle-to-grid power conditioning mode to provide AC power flow and compensation for the power grid.

15. The system of claim 14, wherein the control module is configured to:
    obtain an instantaneous time domain voltage at an AC interface between the power grid and the electrical system;
    obtain an instantaneous time domain current at the AC interface;
    obtain a power compensation request; and
    process the instantaneous time domain voltage, the instantaneous time domain current, and the power compensation request to generate a time domain control current to control operation of the plurality of switches.

16. The system of claim 13, wherein the control module is configured to control operation of the plurality of switches during the vehicle-to-grid power conditioning mode to provide power harmonics control and compensation for the power grid.

17. The system of claim 16, wherein the control module is configured to:
    obtain an instantaneous time domain voltage at an AC interface between the power grid and the electrical system;
    obtain an instantaneous time domain current at the AC interface;
    obtain a DC voltage associated with the DC energy storage system; and
    process the instantaneous time domain voltage, the instantaneous time domain current, and the DC voltage to generate a time domain control current to control operation of the plurality of switches.

18. An onboard power line quality conditioning system for a vehicle, the system comprising:
    a rechargeable direct current (DC) energy storage system onboard the vehicle and configured to provide DC energy to drive an electric traction motor of the vehicle;
    an electrical system onboard the vehicle and configured for electrical coupling in parallel with an alternating current (AC) power grid to support a grid-to-vehicle charging mode and a vehicle-to-grid power conditioning mode;
    an onboard control module for the electrical system, the control module configured to control operation of the electrical system during the vehicle-to-grid power conditioning mode to condition an AC voltage at an AC interface between the electrical system and the AC power grid; and
    a data communication module coupled to the electrical system to receive data that influences conditioning of the AC voltage at the AC interface during the vehicle-to-grid power conditioning mode.

19. The system of claim 18, wherein:
    the control module is configured to control operation of the electrical system during the vehicle-to-grid power conditioning mode to provide AC power flow and compensation at the AC interface using energy from the DC energy storage system; and
    the control module is configured to control operation of the electrical system during the vehicle-to-grid power conditioning mode to provide power harmonics control and compensation at the AC interface using energy from the DC energy storage system.

* * * * *